United States Patent
Isaka

(10) Patent No.: US 12,491,564 B2
(45) Date of Patent: Dec. 9, 2025

(54) COATED CUTTING TOOL

(71) Applicant: MOLDINO Tool Engineering, Ltd., Tokyo (JP)

(72) Inventor: Masakazu Isaka, Narita (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 567 days.

(21) Appl. No.: 17/762,809

(22) PCT Filed: Oct. 21, 2020

(86) PCT No.: PCT/JP2020/039604
§ 371 (c)(1),
(2) Date: Mar. 23, 2022

(87) PCT Pub. No.: WO2021/106440
PCT Pub. Date: Jun. 3, 2021

(65) Prior Publication Data
US 2022/0331882 A1    Oct. 20, 2022

(30) Foreign Application Priority Data

Nov. 27, 2019  (JP) .................................. 2019-213826
Nov. 27, 2019  (JP) .................................. 2019-214083

(51) Int. Cl.
| | |
|---|---|
| C23C 28/04 | (2006.01) |
| B23B 27/14 | (2006.01) |
| C23C 14/06 | (2006.01) |
| C23C 14/32 | (2006.01) |
| C23C 14/50 | (2006.01) |
| C23C 14/58 | (2006.01) |

(52) U.S. Cl.
CPC ........ *B23B 27/148* (2013.01); *C23C 14/0652* (2013.01); *C23C 14/325* (2013.01); *C23C 14/505* (2013.01); *C23C 14/588* (2013.01); *B23B 2228/10* (2013.01)

(58) Field of Classification Search
None
See application file for complete search history.

(56) References Cited

U.S. PATENT DOCUMENTS

| | | |
|---|---|---|
| 2015/0023751 A1 | 1/2015 | Andersson et al. |
| 2017/0096733 A1 | 4/2017 | Sasaki et al. |
| 2018/0243837 A1 | 8/2018 | Sakurai et al. |
| 2020/0298316 A1 | 9/2020 | Sasaki et al. |

FOREIGN PATENT DOCUMENTS

| | | | |
|---|---|---|---|
| CN | 101524904 A | 9/2009 | |
| JP | 2006-137982 A | 6/2006 | |
| JP | 2011-093085 A | 5/2011 | |
| JP | 2011-189471 A | 9/2011 | |
| JP | 2011-189472 A | 9/2011 | |
| JP | 5303816 B2 * | 10/2013 | |
| JP | 2013-233603 A | 11/2013 | |
| JP | 2016-078131 A | 5/2016 | |
| JP | 2017-001147 A | 1/2017 | |
| JP | 2019-171482 A | 10/2019 | |
| WO | 2014/156699 A1 | 10/2014 | |
| WO | 2015/141743 A1 | 9/2015 | |
| WO | WO-2017037955 A1 * | 3/2017 | ........... B23B 27/148 |
| WO | 2017/073653 A1 | 5/2017 | |

OTHER PUBLICATIONS

International Search Report mailed Dec. 28, 2020, issued for PCT/JP2020/039604 and English translation thereof.
Office Action mailed Mar. 14, 2023, issued for Japanese Patent Application No. 2019-213826 and English translation thereof.
Office Action mailed Oct. 26, 2023, issued for CN202080067356.0 and English translation of the Search Report.
Notice of Allowance issued in Chinese Patent Application No. CN 202080067356.0, mailed Aug. 29, 2024.

* cited by examiner

*Primary Examiner* — Kim S. Horger
(74) *Attorney, Agent, or Firm* — Troutman Pepper Locke LLP; James E. Armstrong, IV; Nicholas J. DiCeglie, Jr.

(57) ABSTRACT

A coated cutting tool which has, on a surface of a substrate, a layer A of a face-centered cubic lattice structure which is a nitride or carbonitride containing 50 atom % or more of Al, 20 atom % or more of Cr, 85 atom % or more of Al and Cr, and 4 atom % or more and 15 atom % or less of Si, and a layer B provided on the layer A. The layer B is a nitride or carbon nitride which contains 70 atom % or more and 90 atom % or less of Ti, 5 atom % or more and 20 atom % or less of Si, and 1 atom % or more and 10 atom % or less of Nb or Cr in terms of a total amount of metal (including metalloid) elements, and has the face-centered cubic lattice structure.

2 Claims, No Drawings

COATED CUTTING TOOL

TECHNICAL FIELD

The present invention relates to a coated cutting tool such as an end mill.

Priority is claimed on Japanese Patent Application Nos. 2019-214083 and 2019-213826, filed Nov. 27, 2019, the content of which is incorporated herein by reference.

BACKGROUND ART

A nitride or carbonitride of AlCrSi is a type of film having excellent heat resistance and wear resistance, and is applied to a coated cutting tool.

The applicant of the present application has proposed a nitride or carbonitride of AlCrSi in Patent Documents 1 to 3 in which a content ratio of Si is increased to make a film structure finer. Among the coated cutting tools disclosed in Patent Documents 1 to 3, the coated cutting tool provided with a nitride or carbonitride of TiSi on an upper layer has extremely excellent wear resistance and has excellent durability in cutting of a high-hardness steel.

CITATION LIST

Patent Document

[Patent Document 1]
 International Publication No. WO 2015/141743
[Patent Document 2]
 International Publication No. WO2014/156699
[Patent Document 3]
 Japanese Unexamined Patent Application, First Publication No. 2016-078131

SUMMARY OF INVENTION

Technical Problem

The present inventor has confirmed that a coated cutting tool in which a nitride or carbonitride of TiSi is provided on a nitride or carbonitride of AlCrSi having a high Si content ratio and a fine film structure tends to show a wear resistance equal to or higher than that of a cBN tool in cutting of high-hardness steel. However, the present inventor has confirmed that there is room for improvement in durability, when applied to a small-diameter tool having a tool diameter of less than 1 mm and a tool diameter of less than 0.5 mm.

Solution to Problem

An aspect of the present invention is a coated cutting tool which has, on a surface of a substrate, a layer A of a face-centered cubic lattice structure, which is a nitride or carbonitride in which a content ratio of aluminum (Al) is 50 atom % or more, a content ratio of chromium (Cr) is 20 atom % or more, a total content ratio of aluminum (Al) and chromium (Cr) is 85 atom % or more, and a content ratio of silicon (Si) is 4 atom % or more and 15 atom % or less, in a total amount of metal (including metalloid) elements, and a layer B provided on top of the layer A.

The layer B is a nitride or carbonitride in which a content ratio of Ti (titanium) is 70 atom % or more and 90 atom % or less, the content ratio of silicon (Si) is 5 atom % or more and 20 atom % or less, a content ratio of niobium (Nb) or chromium (Cr) is 1 atom % or more and 10 atom % or less, in the total amount of the content ratio of metal (including metalloid) elements, and has the face-centered cubic lattice structure.

A film thickness of the layer A is preferably greater than 1.0 µm, and a film thickness of the layer B is preferably greater than 0.5 µm.

Advantageous Effects of Invention

According to an aspect of the present invention, a coated cutting tool having excellent durability is provided.

In the above aspect, it is possible to improve the durability of the coated cutting tool. Therefore, for example, even in the working of high-hardness pre-hardened steel, it is expected to have the effects of shortening a lead time of mold manufacturing, improving the accuracy of the mold, and reducing a size change due to tempering, which is extremely effective industrially.

DESCRIPTION OF EMBODIMENTS

The present inventor has found that the durability is further improved by adding a trace amount of Nb or Cr to the nitride or carbonitride of TiSi provided on an upper layer in a coated cutting tool based on the nitride or carbonitride of AlCrSi in which a film structure is made finer, and thus conceived the present invention. Hereinafter, the details of the present invention will be described.

The coated cutting tool according to the embodiment of the present invention has a substrate, a layer A disposed on a surface of the substrate, and a layer B provided on the layer A. In the coated cutting tool of the present embodiment, if necessary, other films, such as an intermediate film disposed between the substrate and a hard coating film, an intermediate film disposed between the layer A and the layer B, and a protective film disposed on an upper layer of the layer B, may be applied.

The layer A is a nitride or carbonitride mainly containing Al and Cr. The nitride or carbonitride mainly containing Al and Cr is a type of film having excellent wear resistance and heat resistance, and can enhance durability of a tool by being applied to a coated cutting tool. A material of the layer A is more preferably a nitride having better heat resistance than the carbonitride.

Al is an element that imparts heat resistance to a hard coating film. In order to impart better heat resistance to the hard coating film, the layer A contains 50% or more of Al in a content ratio (atom %, the same applies hereinafter) of metal (including metalloid, the same applies hereinafter) elements. Further, it is preferable that the content ratio of Al in the layer A be 55% or more. On the other hand, when the content ratio of Al in the layer A becomes too high, a hexagonal close-packed structure (an hcp structure, the same applies hereinafter) becomes the main composition, and the durability of the coated cutting tool tends to deteriorate. Therefore, it is preferable that the content ratio of Al in the layer A be 70% or less.

Cr is an element in which a crystal structure of the layer A has a face-centered cubic lattice structure (a fcc structure, the same applies hereinafter), and wear resistance and heat resistance of a coated cutting tool are improved. If the content ratio of Cr in the layer A becomes too low, because the wear resistance and heat resistance are lowered, and the hcp structure becomes the main structure, the durability of the coated cutting tool tends to decrease. Therefore, the content ratio of Cr in the layer A is set to 20% or more. Furthermore, it is preferable that the content ratio of Cr in the layer A be 30% or more. On the other hand, if the content ratio of Cr in the layer A becomes too high, the heat resistance tends to decrease. Therefore, it is preferable that the content ratio of Cr in the layer A be 45% or less.

The layer A has a total content ratio of Al and Cr of 85% or more to achieve both heat resistance and wear resistance at a high level. Furthermore, it is preferable that the total content ratio of Al and Cr in the layer A be 90% or more. The total content ratio of Al and Cr in the layer A is preferably 96% or less, and more preferably 95% or less.

Si is an important element for making the structure of the nitride or carbonitride mainly composed of Al and Cr finer. Columnar particles of AlCrN that does not contain Si and AlCrSiN that has a low Si content ratio become coarse. Since the hard coating film having such a structure form has many grain boundaries that are starting points of film fracture, a flank wear of the coated cutting tool tends to increase. On the other hand, AlCrSiN containing a fixed amount of Si becomes finer, and it becomes difficult to observe clearly columnar particles, for example, in a cross-section observation (20,000 times) using an electron microscope. The hard coating film having such a structure form has fewer columnar grain boundaries that are the starting points of fracture, and can suppress the flank wear of the coated cutting tool. However, when the content ratio of Si in the layer A becomes high, the amorphous and hcp structures tend to be the main structure, and the durability of the coated cutting tool decreases. In order to sufficiently make the film structure finer without decreasing the durability of the coated cutting tool, it is important to set the content ratio of Si in the layer A to be 4% or more and 15% or less. The content ratio of Si in the layer A is preferably 5% or more. The content ratio of Si in the layer A is preferably 10% or less.

The layer A may contain metal elements other than Al, Cr, and Si. For example, the layer A can contain elements of group 4a, group 5a, and group 6a of the periodic table and one or more kinds of elements selected from B, Cu, Y, and Yb. These elements are elements added to AlTiN-based and AlCrN-based hard coating films to improve the characteristics of the hard coating films, and do not significantly reduce the durability of the coated cutting tool, unless the content ratio is excessive.

However, if the layer A contains a large amount of metal elements other than Al, Cr and Si, there is a risk that the basic characteristics of the nitride or carbonitride mainly containing Al and Cr may be impaired and the durability of the coated cutting tool may be degraded. Therefore, even when the layer A contains the metal elements other than Al, Cr, and Si, it is preferable that the total content ratio thereof be set to 10% or less. Further, even when the layer A contains the metal elements other than Al, Cr and Si, it is preferable that the total content ratio thereof be set to 5% or less.

In the coated cutting tool of the present embodiment, an intermediate film of a metal, a nitride, a carbonitride, a carbide or the like may be provided between the substrate and the layer A. By providing the intermediate film, the adhesion between the substrate and the hard coating film may be further improved. Further, the surface of the substrate may be subjected to a metal bombardment treatment to form a modified phase of a nano-level. The intermediate film may be a single layer or may be multiple layers. The intermediate film may be provided after the metal bombardment treatment.

It is important that the layer A in the present embodiment have an fcc structure. In the present embodiment, the fact that the layer has the fcc structure means that a peak intensity due to the fcc structure shows a maximum intensity in an intensity profile obtained from an X-ray diffraction pattern or a restricted visual field diffraction pattern of the transmission electron microscope. Since the hard coating film in which the diffraction intensity due to the hcp structure shows the maximum intensity is fragile, the durability of a coated cutting tool becomes poor. In particular, in wet cutting, the durability tends to decrease. The layer A preferably does not have the diffraction intensity due to the hcp structure in the X-ray diffraction pattern. It is preferable that the layer A has a film structure in which a peak intensity of a (200) plane or a (111) plane in the fcc structure is the maximum because it tends to show excellent durability.

In the layer A, when the content ratio of Si is high, AlN having an hcp structure can be present in the microstructure. To quantify the amount of AlN of the hcp structure present in the microstructure of the hard coating film, the intensity profile obtained from the restricted visual field diffraction pattern of the transmission electron microscope can be used when observing the processed cross section of the hard coating film. Specifically, the relationship of Ih×100/Is is evaluated in the intensity profile of the restricted visual field diffraction pattern of the transmission electron microscope.

Ih=peak intensity due to (010) plane of AlN of hcp structure Is=sum of peak intensity due to (111) plane of AlN, (111) plane of CrN, (200) plane of AlN, (200) plane of CrN, (220) plane of AlN, and (220) plane of CrN of the fcc structure and peak intensity due to (010) plane of AlN, (011) plane of AlN, and (110) plane of AlN of the hcp structure.

By evaluating the above relationship, it is possible to quantitatively evaluate the AlN of the hcp structure included at a micro level in the hard coating film in which the peak intensity due to the AlN of the hcp structure is not confirmed by X-ray diffraction.

It is preferable that the AlN of the hcp structure in the microstructure be reduced such that the layer A satisfies the relationship of Ih×100/Is≤25. When the relationship of Ih×100/Is≤25 is satisfied, the durability of the coated cutting tool becomes more excellent. Further, it is preferable that the layer A satisfy the relationship of Ih×100/Is≤20.

Next, the layer B will be explained.

The layer B is a hard coating film disposed on the layer A. The layer B is based on a nitride or carbonitride of TiSi, which is a type of film having excellent wear resistance and heat resistance. A trace amount of Nb or Cr is further added to the layer B. The present inventor examined the addition of a third element to further enhance the wear resistance of TiSiN. Further, it was confirmed that the hardness was enhanced by adding a trace amount of Nb or Cr to TiSiN in which the content ratio of Si was suppressed, and the wear resistance of the coated cutting tool was improved. The details of the mechanism in which the wear resistance is improved are unknown. However, it is presumed to be due to the fact that, when Nb or Cr is partially replaced with Ti of TiN, the lattice is distorted and hardened by a difference in atomic radius between Ti and Nb or Cr.

If the content ratio of Ti in the layer B is too low or too high, the wear resistance and heat resistance of the hard coating film decrease. Therefore, the layer B has a content ratio of Ti (titanium) of 60% or more and 90% or less in a total amount of metal (including metalloid) elements.

If the content ratio of Si in the layer B is too low, the film structure will be insufficiently fined and the wear resistance of the hard coating film decreases. Further, if the content ratio of Si in the layer B is too high, because the film structure becomes too fine and becomes almost amorphous, the wear resistance of the hard coating film decreases. Therefore, the layer B has a content ratio of Si (silicon) of 5% or more and 20% or less in a total amount of metal (including metalloid) elements.

If the content ratio of Nb or Cr in the layer B is too low, the improvement effect of the wear resistance of the hard coating film is not sufficient. On the other hand, if the content ratio of Nb or Cr in the layer B is too high, a large amount of concentrated phases of fragile Nb or Cr are deposited, and the wear resistance of the hard coating film decreases. Therefore, the layer B has a content ratio of Nb (niobium) or Cr (chromium) of 1% or more and 10% or less in a total amount of metal (including metalloid) elements. Furthermore, the content ratio of Nb or Cr in the layer B is preferably 2% or more. The content ratio of Nb or Cr in the layer B is preferably 8% or less. The content ratio of Nb or Cr in the layer B is more preferably 6% or less.

It is important that the layer B in the present embodiment have an fcc structure. In the present embodiment, the fact that the layer has the fcc structure means that the peak intensity due to the fcc structure shows the maximum intensity in the intensity profile obtained from the X-ray diffraction pattern or the restricted visual field diffraction pattern of the transmission electron microscope. Since the hard coating film in which the diffraction intensity due to the hcp structure shows the maximum intensity is fragile, the durability of a coated cutting tool becomes poor. In particular, in wet working, the durability tends to decrease. It is preferable that the layer B not have the diffraction intensity due to the hcp structure in the X-ray diffraction pattern. It is preferable that the layer B has a film structure in which the peak intensity of the (200) plane in the fcc structures is the maximum because it tends to show excellent durability.

In the layer B, an average crystal grain size of the hard coating film constituting the layer B is preferably 5 nm or more and 50 nm or less. When the microstructure of the hard coating film becomes too fine, because the structure of the hard coating film becomes close to amorphous, the toughness and hardness of the hard coating film decrease. In order to enhance the crystallinity of the hard coating film and reduce the fragile amorphous phase, the average crystal grain size of the hard coating film is set to 5 nm or more. Further, if the microstructure of the hard coating film becomes too coarse, the hardness of the hard coating film tends to decrease and the durability of the coated cutting tool tends to decrease. In order to impart high hardness to the hard coating film and enhance the durability of the coated cutting tool, the average crystal grain size of the hard coating film is set to 50 nm or less. Further, the average crystal grain size of the hard coating film is preferably 30 nm or less.

The average crystal grain size of the hard coating film can be measured from the half width of X-ray diffraction peak.

The layer B may be provided directly above the layer A. In order to further enhance the adhesion, a laminated film containing the composition of the layer A and the layer B may be provided between the layer A and the layer B. Further, a hard coating film other than the composition of the layer A and the layer B may be provided between the layer A and the layer B. Another hard coating film may be provided on the layer B.

The coated cutting tool according to the embodiment of the present invention is particularly preferable in that the improvement effect of durability is more effectively exhibited by being applied to a small-diameter end mill having a tool diameter of 2 mm or less. Further, it is preferable to apply the configuration of the coated cutting tool of the present embodiment to a small-diameter end mill having a tool diameter of 1 mm or less.

In the coated cutting tool according to the embodiment of the present invention, it is preferable that the layer A be a film thicker than the layer B. By setting the layer A provided on the substrate side to a film thicker than the layer B, the durability of the coated cutting tool is enhanced. Further, it is preferable that the film thickness of the layer A be larger than 1.0 μm and the film thickness of the layer B be larger than 0.5 μm.

For both the layer A and the layer B, if the film thickness is made too large, peeling is likely to occur, and the durability of the coated cutting tool decreases. Upper limits of the film thicknesses of the layer A and the layer B differ depending on the composition of the hard coating film including the intermediate layer and the surface layer. As an example, it is preferable that the upper limit of the film thickness of the layer A be less than 4 μm, the upper limit of the film thickness of the layer B be less than 3.5 μm, and the upper limit of the total film thickness of the layer A and the layer B be 5 μm or less.

EXAMPLE

Example 1

<Film Deposition Device>

An arc ion plating type film deposition device was used to form the hard coating film. The device includes a plurality of cathodes (arc evaporation sources), a vacuum vessel and a substrate rotation mechanism.

The device includes three cathodes C1, C2, and C3. C1 is a cathode in which a coil magnet is disposed on an outer periphery of a target. C2 and C3 are cathodes in which a permanent magnet is disposed on a back surface and the outer periphery of the target. In C2 and C3, the magnetic flux density in a vertical direction of the target is 14 mT or more near a center of the target. The target mounted on C2 and C3 varied in composition depending on the sample.

The interior of the vacuum vessel is exhausted by a vacuum pump. A film deposition gas is introduced into the vacuum vessel from a supply port. A bias power supply is connected to each substrate installed inside the vacuum vessel. The bias power supply applies a negative DC bias voltage to each substrate.

The substrate rotation mechanism has a planetary, a plate-shaped jig on the planetary, and a pipe-shaped jig on the plate-shaped jig. The planetary rotates at a speed of 3 revolutions per minute. The plate-shaped jig and the pipe-shaped jig rotate and revolve, respectively.

<Substrate>

As a substrate for physical property evaluation and cutting test, two-flute ball end mills made of a cemented carbide having a composition of WC (bal.)-Co (8% by mass)-Cr (0.5% by mass)-VC (0.3% by mass), a WC average particle size of 0.6 μm, and a hardness of 93.9 HRA was prepared. Further, WC represents tungsten carbide, Co represents cobalt, Cr represents chromium, and VC represents vanadium carbide.

<Heating and Vacuum Exhaust Process>

Each substrate was fixed to the pipe-shaped jig in the vacuum vessel, and the pre-deposition process was carried out as follows. First, the interior of the vacuum vessel was evacuated to $8 \times 10^{-3}$ Pa or less. After that, a heater installed in the vacuum vessel was used to heat the substrate until the temperature reached 500° C., and the vacuum exhaust was performed. As a result, the temperature of the substrate was set to 500° C., and the pressure in the vacuum vessel was set to $8\times10^{-3}$ Pa or less.

<Ar Bombardment Process>

After that, Ar gas was introduced into the vacuum vessel, and the pressure inside the vessel was set to 0.67 Pa. Then, a current of 35 A was supplied to a filament electrode, a negative bias voltage of −200 V was applied to the substrate, and Ar bombardment was performed for 4 minutes.

<Ti Bombardment Process>

After that, the vacuum was exhausted so that the pressure in the vacuum vessel was $8\times10^{-3}$ Pa or less. Subsequently, a bias voltage was applied to the substrate, and an arc current of 150 A was supplied to C1 on which the Ti target was mounted to perform the Ti bombardment treatment. By the Ti bombardment treatment, carbides containing W and Ti were formed on the surface of the substrate with a thickness of 1 nm or more and 10 nm or less. The composition of the carbide formed by the Ti bombardment treatment was such that W was 60 atom % or more and 90 atom % or less and Ti was 10 atom % or more and 40 atom % or less in terms of the content ratio of the metal element.

<Film Deposition Process>

Immediately after the Ti bombardment, the power supply to C1 was interrupted. Further, the gas in the vacuum vessel was replaced with nitrogen, the pressure in the vacuum vessel was set to 5 Pa, and the substrate set temperature was set to 520° C. A power of 150 A was supplied to C2 on which the AlCrSi target was mounted, and a negative bias voltage applied to the substrate was set to −120 V and the cathode voltage was set to 30 V to coat the layer A.

After coating the layer A, the layer B was coated. In the coating of the layer B, a TiSiNb target, a TiSiW target, a TiSiTa target, or a TiSi target was used as the target of C3 depending on the sample. A power of 150 A was supplied to C3 on which the target was mounted, and the layer B was coated with a negative bias voltage applied to the substrate of −50 V and a cathode voltage of 25 V. After that, the substrate was cooled to about 250° C. or lower and taken out from the vacuum vessel. Further, each sample after coating was subjected to a polishing treatment of the cutting edge by a blast treatment.

The composition of the hard coating film was measured by wavelength dispersion type electron beam probe microanalysis (WDS-EPMA). The measurement conditions were an acceleration voltage of 10 kV, a sample current of $5\times10^{-8}$ A, an uptake time of 10 seconds, an analysis region diameter of 1 μm, and an analysis depth of approximately 1 μm, the composition was measured at 5 points, and the measurement conditions were calculated from the average value.

The crystal structure was confirmed using an X-ray diffractometer (EMPYREAN vertical goniometer manufactured by Spectris Co., Ltd.). The measurement conditions were a tube voltage of 45 kV, a tube current of 40 mA, an X-ray source of CuKα ($\lambda=0.15418$ nm), X-ray incident angle of 3 degrees, a divergence slit of ½°, collimator of 0.27 mm, and $2\theta=20$ to 70 degrees.

Cutting was performed using the coated cutting tool of each sample produced, and the durability of the coated cutting tool was evaluated from the exposed area of the base metal after cutting. The cutting conditions are shown below.

(Conditions)

Tool: two-flute cemented carbide ball end mills

Model number: EPDBEH2003-0.5-TH3. Ball radius 0.15 mm

Cutting method: Pocket working (1 mm×3 mm×depth 0.4 mm)

Work material: ASP23 (64HRC)

Cut: Axial direction, 0.013 mm, radial direction, 0.013 mm

Cutting speed: 37.7 m/min

Feed per blade: 0.0045 mm/blade

Coolant: Mist blow (oil-based)

Number of working: 7 pockets

Evaluation method: an exposed area of the base metal was observed at a magnification of 600 times, using a scanning electron microscope after cutting, and the area in which the cemented carbide substrate of the tool was exposed was calculated. Commercially available image analysis software was used to calculate the exposed area of the base metal. The evaluation results are summarized in Table 1.

TABLE 1

|  | Layer A | | Layer B | | Exposed |
| --- | --- | --- | --- | --- | --- |
|  | Composition (atom %) | Film thickness (μm) | Composition (atom %) | Film thickness (μm) | area of base material (μm$^2$) |
| Invention example 1 | (Al56Cr38Si6)N | 1 | (Ti82Si15Nb3)N | 0.5 | 3145 |
| Invention example 2 | (Al53Cr40Si7)N | 1 | (Ti82Si13Nb5)N | 0.5 | 3256 |
| Invention example 3 | (Al53Cr40Si7)N | 1.3 | (Ti82Si13Nb5)N | 0.7 | 2388 |
| Comparative example 1 | (Al56Cr38Si6)N | 1 | (Ti75Si22Nb3)N | 0.5 | 5500 |
| Comparative example 2 | (Al52Cr41Si7)N | 1 | (Ti82Si15W3)N | 0.5 | 5800 |
| Comparative example 3 | (Al54Cr39Si7)N | 1 | (Ti82Si15Ta3)N | 0.5 | 6000 |
| Comparative example 4 | (Al54Cr40Si6)N | 1 | (Ti85Si15)N | 0.5 | 4296 |
| Comparative example 5 | (Al56Cr43Si1)N | 1 | (Ti82Si15Nb3)N | 0.5 | 6500 |
| Comparative example 6 | (Al56Cr38Si6)N | 1 | (Ti70Si15Nb15)N | 0.5 | 5800 |

In both the invention examples of the present invention and the comparative examples, the layer A and the layer B were single-phase of the fcc structure in a XRD diffraction. Further, when the intensity profile of the restricted visual field diffraction pattern of the layer A was evaluated by the same method as in Japanese Patent No. 6410797, the value of Ihx100/Is of the layer A was 20 or less. Further, the peak intensity of the fcc (200) plane of the layer B was the maximum, and the average crystal grain size was 5 nm or more and 50 nm or less.

In all Invention examples 1 to 3 in which a trace amount of Nb was added to the layer B on the upper layer of the layer A in which a predetermined amount of Si was contained and the film structure was made finer, the exposed area of the substrate was small and excellent durability was exhibited. In particular, in Invention example 3 in which the total film thickness of the layer A and the layer B was large, the exposed area of the base metal was small, and more excellent durability was exhibited.

On the other hand, although the layer B of Comparative example 1 contained a trace amount of Nb, because the content of Si was high, the exposed area of the base metal was larger than that of the invention example.

In Comparative examples 2 and 3, W (tungsten) and Ta (tantalum) were added in trace amounts instead of Nb, but the layer B was not sufficiently cured, and the exposed area of the base metal was larger than that of the invention example.

In Comparative example 4, since a trace amount of Nb was not added to the layer B, the exposed area of the base metal was larger than that of the invention example.

In Comparative example 5, since the content ratio of Si of the layer A was small, the columnar particles of the film structure were large, and even if the same B layer as in Invention example 1 was provided, the exposed area of the base metal was large.

In Comparative example 6, since the content ratio of Nb of the layer B was large, the concentrated phase of Nb became coarse and the exposed area of the base metal was large.

Example 2

In Example 2, a coated cutting tool was produced by forming a hard coating film made up of the layer A and the layer B on the substrate using the same film deposition device as in Example 1. In Example 2, a TiSiN-based film containing Cr was formed as the layer B. As the substrate of Example 2, the same kind of substrate as that of Example 1 was used.

In the hard coating film formation process in Example 2, heating and vacuum exhaust processes, an Ar bombardment process, and a Ti bombardment process were carried out in the same manner as in Example 1, and then the film formation process was carried out. In the film formation process, a TiSiCr target was used instead of the TiSiNb target of Example 1 as a target for forming the layer B.

The heating and vacuum exhaust process, the Ar bombardment process, and the Ti bombardment process are the same as those in the first embodiment, and thus the description thereof will not be provided.

<Film Formation Process>

Immediately after the Ti bombardment, the power supply to C1 was interrupted. Further, the gas in the vacuum vessel was replaced with nitrogen, the pressure in the vacuum vessel was set to 5 Pa, and the substrate set temperature was set to 520° C. A power of 150 A was supplied to C2 on which the AlCrSi target was mounted, and the negative bias voltage applied to the substrate was set to −120 V and the cathode voltage was set to 30 V to coat the layer A.

After coating the layer A, the layer B was coated. In the coating of the layer B, a TiSiCr target, a TiSiW target, a TiSiTa target, or a TiSi target was used as the target of C3 depending on the sample. A power of 150 A was supplied to C3 on which the target was mounted, and the negative bias voltage applied to the substrate was set to −50 V and a cathode voltage was set to 25 V to coat the layer B. After that, the substrate was cooled to about 250° C. or lower and taken out from the vacuum vessel. Further, each sample after coating was subjected to a polishing treatment of the cutting edge by a blast treatment.

TABLE 2

| | Layer A | | Layer B | | Exposed area of base material ($\mu m^2$) |
|---|---|---|---|---|---|
| | Composition (atom %) | Film thickness ($\mu m$) | Composition (atom %) | Film thickness ($\mu m$) | |
| Invention example 21 | (Al53Cr40Si7)N | 1 | (Ti83Si14Cr3)N | 0.5 | 3398 |
| Invention example 22 | (Al53Cr41Si6)N | 1 | (Ti82Si14Cr4)N | 0.5 | 3466 |
| Invention example 23 | (Al55Cr39Si6)N | 1.3 | (Ti81Si15Cr4)N | 0.7 | 2588 |
| Comparative example 21 | (Al56Cr39Si5)N | 1 | (Ti74Si23Cr3)N | 0.5 | 5800 |
| Comparative example 22 | (Al52Cr41Si7)N | 1 | (Ti82Si15W3)N | 0.5 | 5800 |
| Comparative example 23 | (Al54Cr39Si7)N | 1 | (Ti82Si15Ta3)N | 0.5 | 6000 |
| Comparative example 24 | (Al54Cr40Si6)N | 1 | (Ti85Si15)N | 0.5 | 4296 |
| Comparative example 25 | (Al155Cr44Si1)N | 1 | (Ti82Si14Cr4)N | 0.5 | 6600 |
| Comparative example 26 | (Al56Cr38Si6)N | 1 | (Ti70Si15Cr15)N | 0.5 | 5800 |

In Example 2, both the layer A and the layer B were single-phase of the fcc structure in the XRD diffraction in both the invention example and the comparative example. Further, when the intensity profile of the restricted visual field diffraction pattern of the layer A was evaluated by the same method as in Japanese Patent No. 6410797, the value of Ih×100/Is of the layer A was 20 or less. Further, the peak intensity of the fcc (200) plane of the layer B was the maximum, and the average crystal grain size was 5 nm or more and 50 nm or less.

In Invention examples 21 to 23 in which a trace amount of Cr was added to the layer B on the upper layer of the layer A in which a predetermined amount of Si was contained and the film structure was made finer, the exposed area of the substrate was small and excellent durability was exhibited. In particular, in Invention example 23 in which the total film thickness of the layer A and the layer B was large, the exposed area of the base metal was small, and more excellent durability was exhibited.

On the other hand, although a trace amount of Cr was added to the layer B of Comparative example 21, because the content of Si was high, the exposed area of the base metal was larger than that of the invention example.

In Comparative examples 22 and 23, although W (tungsten) and Ta (tantalum) were added in trace amounts instead of Cr, the layer B was not sufficiently cured, and the exposed area of the base metal was larger than that of the invention examples.

In Comparative example 24, since a trace amount of Cr was not added to the layer B, the exposed area of the base metal was larger than that of the invention example.

In Comparative example 25, since the content ratio of Si of the layer A was low, the columnar particles of the film structure were large, and even if the same B layer as in Invention example 21 was provided, the exposed area of the base metal was large.

In Comparative example 26, since the content ratio of Cr of the layer B was large, the concentrated phase of Cr became coarse and the exposed area of the base metal became large.

The invention claimed is:

1. A coated cutting tool which has, on a surface of a substrate, a layer A of a face-centered cubic lattice structure, which is a nitride or carbonitride in which a content ratio of aluminum (Al) is 50 atom % or more, a content ratio of chromium (Cr) is 20 atom % or more, a total content ratio of aluminum (Al) and chromium (Cr) is 85 atom % or more, and a content ratio of silicon (Si) is 4 atom % or more and 15 atom % or less, in a total amount of metal elements including metalloid elements, and a layer B provided directly on top of the layer A, wherein the layer B is a nitride or carbonitride in which a content ratio of titanium (Ti) is 70 atom % or more and 90 atom % or less, the content ratio of silicon (Si) is 5 atom % or more and 20 atom % or less, and a content ratio of niobium (Nb) or chromium (Cr) is 1 atom % or more and 10 atom % or less, in the total amount of metal elements including metalloid elements, and has the face-centered cubic lattice structure, and the layer A satisfies a relationship of Ih×100/Is≤20 in a case where Ih is peak intensity due to (010) plane of AlN of hcp structure and Is is sum of peak intensity due to (111) plane of AlN, (111) plane of CrN, (200) plane of AlN, (200) plane of CrN, (220) plane of AlN, and (220) plane of CrN of the fcc structure and peak intensity due to (010) plane of AlN, (011) plane of AlN, and (110) plane of AlN of the hcp structure.

2. The coated cutting tool according to claim 1, wherein a film thickness of the layer A is greater than 1.0 μm, and a film thickness of the layer B is greater than 0.5 μm.

* * * * *